(12) United States Patent
Matsueda

(10) Patent No.: US 7,911,630 B2
(45) Date of Patent: Mar. 22, 2011

(54) PRINT PROCESSING SYSTEM, CONTROL APPARATUS AND CONTROL METHOD THEREOF, AND COMPUTER-READABLE RECORDING MEDIUM

(75) Inventor: Kazutaka Matsueda, Yokohama (JP)

(73) Assignee: Canon Kabushiki Kaisha (JP)

( * ) Notice: Subject to any disclaimer, the term of this patent is extended or adjusted under 35 U.S.C. 154(b) by 543 days.

(21) Appl. No.: 12/057,858

(22) Filed: Mar. 28, 2008

(65) Prior Publication Data
US 2008/0239382 A1    Oct. 2, 2008

(30) Foreign Application Priority Data

Apr. 2, 2007   (JP) .................... 2007-096596

(51) Int. Cl.
*G06F 3/12* (2006.01)
*G06K 15/00* (2006.01)
(52) U.S. Cl. .................... 358/1.14; 358/1.15
(58) Field of Classification Search ............ 358/1.14, 358/1.15
See application file for complete search history.

(56) References Cited

U.S. PATENT DOCUMENTS

| | | | |
|---|---|---|---|
| 2002/0083114 A1* | 6/2002 | Mazzagatte et al. | 709/100 |
| 2002/0085228 A1* | 7/2002 | Yagita | 358/1.15 |
| 2004/0165209 A1 | 8/2004 | Aoki et al. | |
| 2006/0039024 A1* | 2/2006 | Iida et al. | 358/1.14 |
| 2006/0139690 A1* | 6/2006 | Yagita | 358/1.15 |

FOREIGN PATENT DOCUMENTS

| | | |
|---|---|---|
| JP | 2001-075768 A | 3/2001 |
| JP | 2004-195972 A | 7/2004 |
| JP | 2005-190193 A | 7/2005 |
| JP | 2006-004077 A | 1/2006 |
| JP | 2006-191335 A | 7/2006 |

OTHER PUBLICATIONS

Office Action issued on Apr. 24, 2009 in corresponding Japanese Patent Application No. 2007-096596.
Office Action dated Dec. 20, 2010 issued in corresponding Japanese Patent Application No. 2009-204133, which is a divisional application of the Japanese Patent Application No. 2007-096596.

* cited by examiner

*Primary Examiner* — Twyler L Haskins
*Assistant Examiner* — Fred Guillermety
(74) *Attorney, Agent, or Firm* — Rossi, Kimms & McDowell LLP

(57) ABSTRACT

In order to solve one or more problems encountered in the grouping of print jobs spanning a plurality of servers, a control apparatus within a print processing system includes: a designation unit for designating a plurality of print jobs; a generation unit for acquiring the plurality of print jobs from an applicable server, and generating a combined print job that includes the plurality of print jobs; and a setting unit which, when an error has occurred in the acquisition of the plurality of print jobs, is for setting whether to exercise control so as to execute processing of all of the plurality of print jobs after recovery from the error is achieved, or so as to execute processing of print jobs with the exception of the print job in which the error occurred.

12 Claims, 15 Drawing Sheets

FIG. 9

SELECT JOBS ARE IN DIFFERENT
SERVERS. DO YOU WISH
TO PRINT THEM?

OK   CANCEL

FIG. 11

PRINTING HAS BEEN INTERRUPTED
WHILE IN PROGRESS.
A PRINTABLE JOB REMAINS.
SELECT THE DESIRED POST-PROCESSING
AND PRESS THE OK BUTTON

☐ TERMINAL DUE TO ERROR
☐ SKIP JOB HAVING ERROR
☐ WAIT FOR SERVER RECOVERY

OK  CANCEL

PRINT PROCESSING SYSTEM, CONTROL APPARATUS AND CONTROL METHOD THEREOF, AND COMPUTER-READABLE RECORDING MEDIUM

BACKGROUND OF THE INVENTION

1. Field of the Invention

The present invention relates to a print processing technique and, more particularly, to a job grouping technique for handling a plurality of jobs collectively as a single job.

2. Description of the Related Art

A conventional method of controlling the print order of print jobs is to perform continuous printing collectively in conformity with the order of printing, as disclosed in the specification of Japanese Patent Application Laid-Open No. 2001-75768. Further, "push" printing has been used as a method of printing from a server to a device. This can be implemented in simple fashion without requiring a large console on the device side. With conventional push printing, however, printing control is carried out with the status of the device unknown. Consequently, there are occasions where printing ends unexpectedly owing to a shortage of paper, etc.

With the progress that has been made in enlarging the device control panel in recent years, "pull"-type printing can now be performed in a manner similar to that of a personal computer, etc. With pull printing, jobs held in a server are displayed in list form on the control panel, selection of a job is accepted from the user and print processing is executed. In other words, control is exercised in such a manner that print jobs flow from the server to the device. Further, another available arrangement of pull printing is one that prints jobs from a plurality of servers. For example, the server that displays a job is changed over as by pressing a tab on the control panel. Further, there is a job grouping function whereby a plurality of print jobs are handled collectively as a single job and control is exercised in such a manner that back-to-back jobs are not allowed to be interrupted by another job.

However, a certain problem arises when a plurality of jobs spanning a plurality of servers are grouped. Specifically, if an error occurs in one or more jobs among a grouped plurality of jobs, print processing cannot be executed normally. The only solution has been to terminate print processing by treating all of the print jobs as being in error or to execute processing only up to the job immediately preceding the occurrence of the error.

SUMMARY OF THE INVENTION

The present invention has been devised in view of the foregoing problems and seeks to solve one or more problems in the grouping of jobs spanning a plurality of servers.

According to one aspect of the present invention, a print processing system that includes at least one server apparatus storing a print job, and a control apparatus controlling execution of processing of the print job by designating the print job stored in the server apparatus, wherein the server apparatus comprises: a designation unit for designating a plurality of print jobs; a generation unit for acquiring the plurality of print jobs, which have been designated by the designation unit, from an applicable server, and generating a combined print job that includes the plurality of print jobs; and a setting unit which, when an error has occurred in the acquisition of the plurality of print jobs in the generation unit, is for setting whether to exercise control so as to execute processing of the combined print job inclusive of all of the plurality of print jobs after recovery from the error is achieved, or so as to execute processing of the combined print job inclusive of print jobs with the exception of the print job in which the error occurred.

According to another aspect of the present invention, a control apparatus, which is connected via a network to at least one server apparatus storing a print job, for controlling execution of processing of the print job by designating the print job stored in the server apparatus, the control apparatus comprises: a designation unit for designating a plurality of print jobs; a generation unit for acquiring the plurality of print jobs, which have been designated by the designation unit, from an applicable server, and generating a combined print job that includes the plurality of print jobs; and a setting unit which, when an error has occurred in the acquisition of the plurality of print jobs in the generation unit, is for setting whether to exercise control so as to execute processing of the combined print job inclusive of all of the plurality of print jobs after recovery from the error is achieved, or so as to execute processing of the combined print job inclusive of print jobs with the exception of the print job in which the error occurred.

According to still another aspect of the present invention, a method of controlling a control apparatus, which is connected via a network to at least one server apparatus storing a print job, for controlling execution of processing of the print job by designating the print job stored in the server apparatus, the method comprises: a designation step of designating a plurality of print jobs; a generation step of acquiring the plurality of print jobs, which have been designated at the designation step, from an applicable server, and generating a combined print job that includes the plurality of print jobs; and a setting step which, when an error has occurred in the acquisition of the plurality of print jobs at the generation step, is a step of setting whether to exercise control so as to execute processing of the combined print job inclusive of all of the plurality of print jobs after recovery from the error is achieved, or so as to execute processing of the combined print job inclusive of print jobs with the exception of the print job in which the error occurred.

According to yet another aspect of the present invention, a computer-readable recording medium storing a computer program for controlling a control apparatus, which is connected via a network to at least one server apparatus storing a print job, for controlling execution of processing of the print job by designating the print job stored in the server apparatus, the computer program comprises: a designation step of designating a plurality of print jobs; a generation step of acquiring the plurality of print jobs, which have been designated at the designation step, from an applicable server, and generating a combined print job that includes the plurality of print jobs; and a setting step which, when an error has occurred in the acquisition of the plurality of print jobs at the generation step, is a step of setting whether to exercise control so as to execute processing of the combined print job inclusive of all of the plurality of print jobs is executed after recovery from the error is achieved, or so as to execute processing of the combined print job inclusive of print jobs with the exception of the print job in which the error occurred.

In accordance with the present invention, one or more problems in the grouping of jobs spanning a plurality of servers can be solved.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 9 is a diagram illustrating an example of verification (alert) dialog;

FIG. 11 is a diagram illustrating an example of dialog displayed at occurrence of an error;

DESCRIPTION OF THE EMBODIMENT

A preferred embodiment of the present invention will now be described in detail with reference to the accompanying drawings. It should be noted that the structural elements described in this embodiment are exemplary and that the scope of the present invention is not limited solely to these structural elements.

First Embodiment

A system including a multifunction printer (MFP) will be described as a first embodiment of a print processing system according to the present invention.

<System Configuration>

Figure 2:
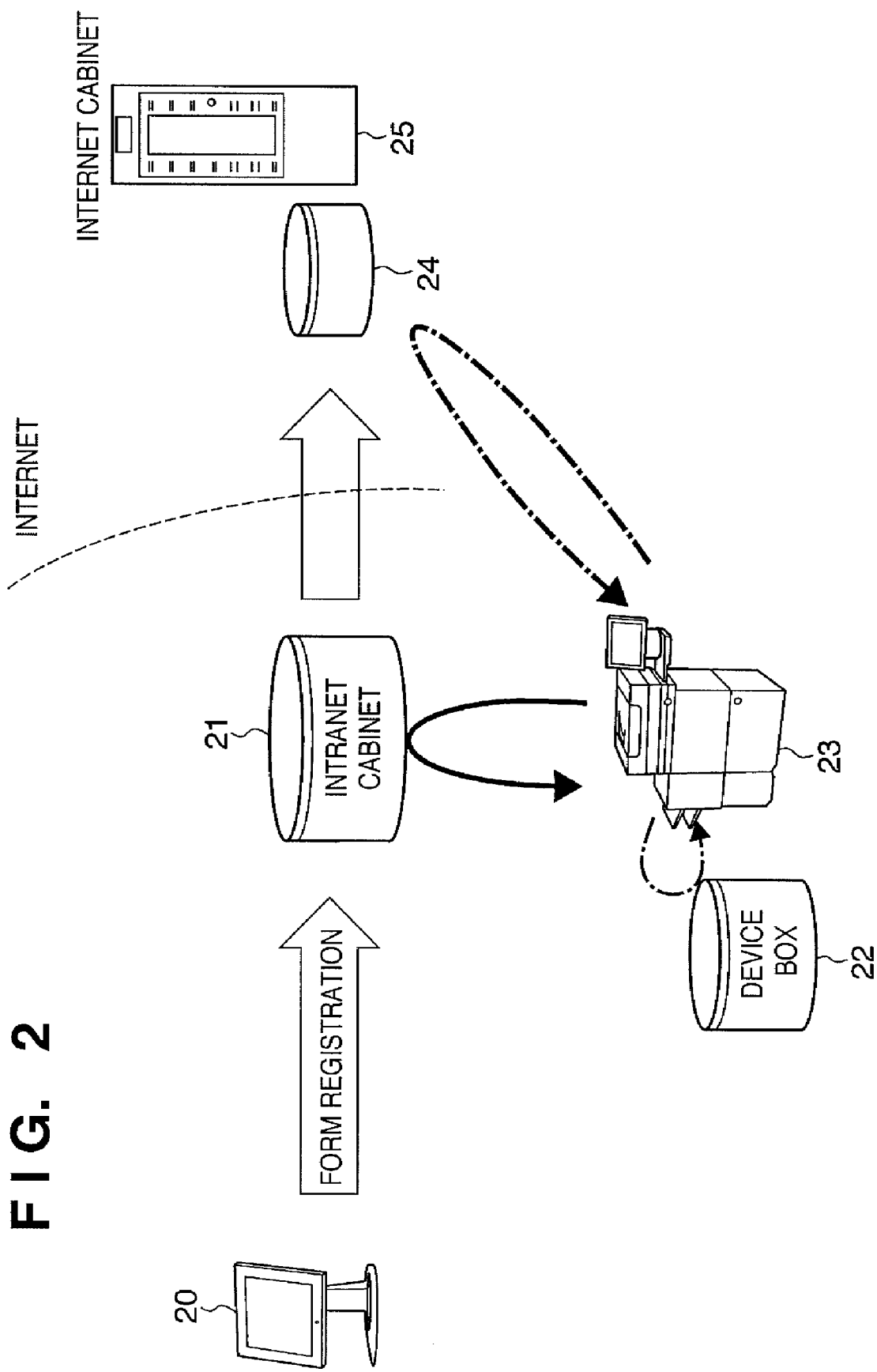
FIG. 2 is a conceptual view of a print processing system according to a first embodiment of the present invention.

FIG. 2 is a conceptual view of a print processing system according to the first embodiment. The print processing system includes a personal computer 20, which is a client that issues a print job, and an intranet cabinet 21 and Internet cabinet 25, which are servers that store print jobs. Further, an MFP 23 is a printing apparatus, which processes print jobs and executes printing, and serves also as a control apparatus for controlling print jobs.

First, form data (a print job) desired to be printed by the MFP 23 is registered in the intranet cabinet 21 from the personal computer 20. The data may be stored in the box of the MFP 23 depending upon circumstances. In this case, the form data is stored in a device box 22. It may be so arranged that once the data has been used in printed, the data is stored in the device box 22.

The Internet cabinet 25 is a storage box that has been made public over the Internet and is provided with a hard disk 24. The Internet cabinet 25 is used when reference materials employed by a company are stored temporarily and referred to at home. Another conceivable method of use is to store a document in the cabinet once the document has been printed.

In a conceivable scenario, forms that have been stored in a plurality of storage areas such as the intranet cabinet 21, device box 22 and Internet cabinet 25 are designated and output when the MFP 23 performs pull printing. In relation to a form within the device box 22, since the box is the MFP's own management area, printing of the form need not be performed by an arrangement identical with one that exists in another server.

Figure 1:
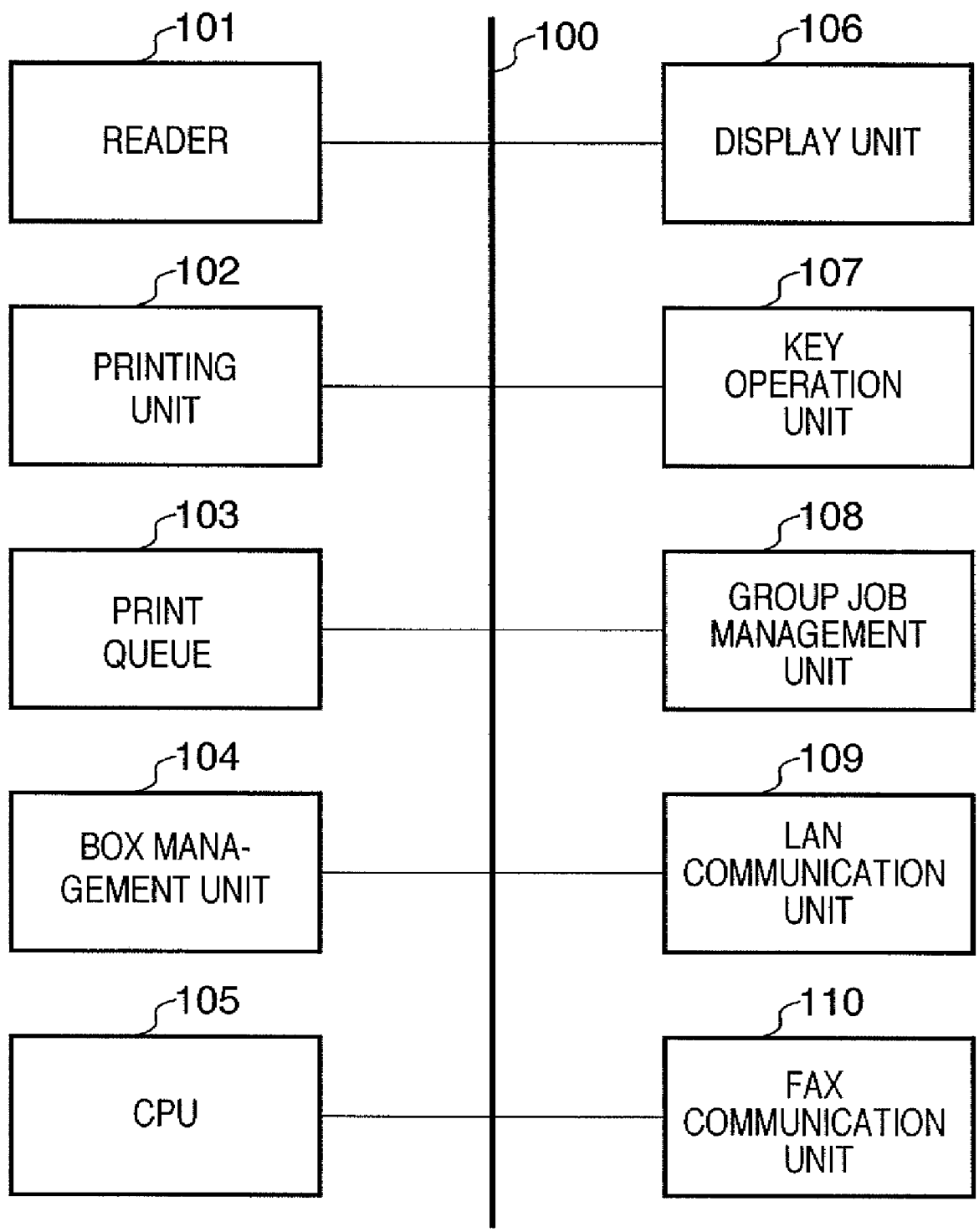
FIG. 1 is a block diagram illustrating the interior of an MFP.

FIG. 1 is a block diagram illustrating the internal configuration of the MFP 23.

A system bus 100 is shown in FIG. 1. A reader 101 comprising a scanner reads a document. A printing unit 102 prints data that has been read and data that has been received. A print queue 103 is for managing order per job that is output by the printing unit 102. A box management unit 104 is a job storage area possessed by the MFP itself and corresponds to the device box 22. Boxes can be used on a user-by-user and category-by-category basis. A CPU 105 administers control of the overall system.

A display unit 106 comprises an LCD, etc. A key operation unit 107 is composed of physical keys such as numeric keys and one-touch keys, as well as soft keys implemented by a touch-sensitive panel integrated with the display unit 106. The key operation unit 107 also functions as an operation input unit for accepting inputs from the user. A group job management unit 108 is for managing only information concerning a job present in the server in a case where group printing has been specified. A LAN communication unit 109 makes it possible to access the Internet and the intranet. A job and job information is received using the LAN communication unit 109. A FAX communication unit 110 performs facsimile transmission and reception utilizing a public line.

Figure 3:
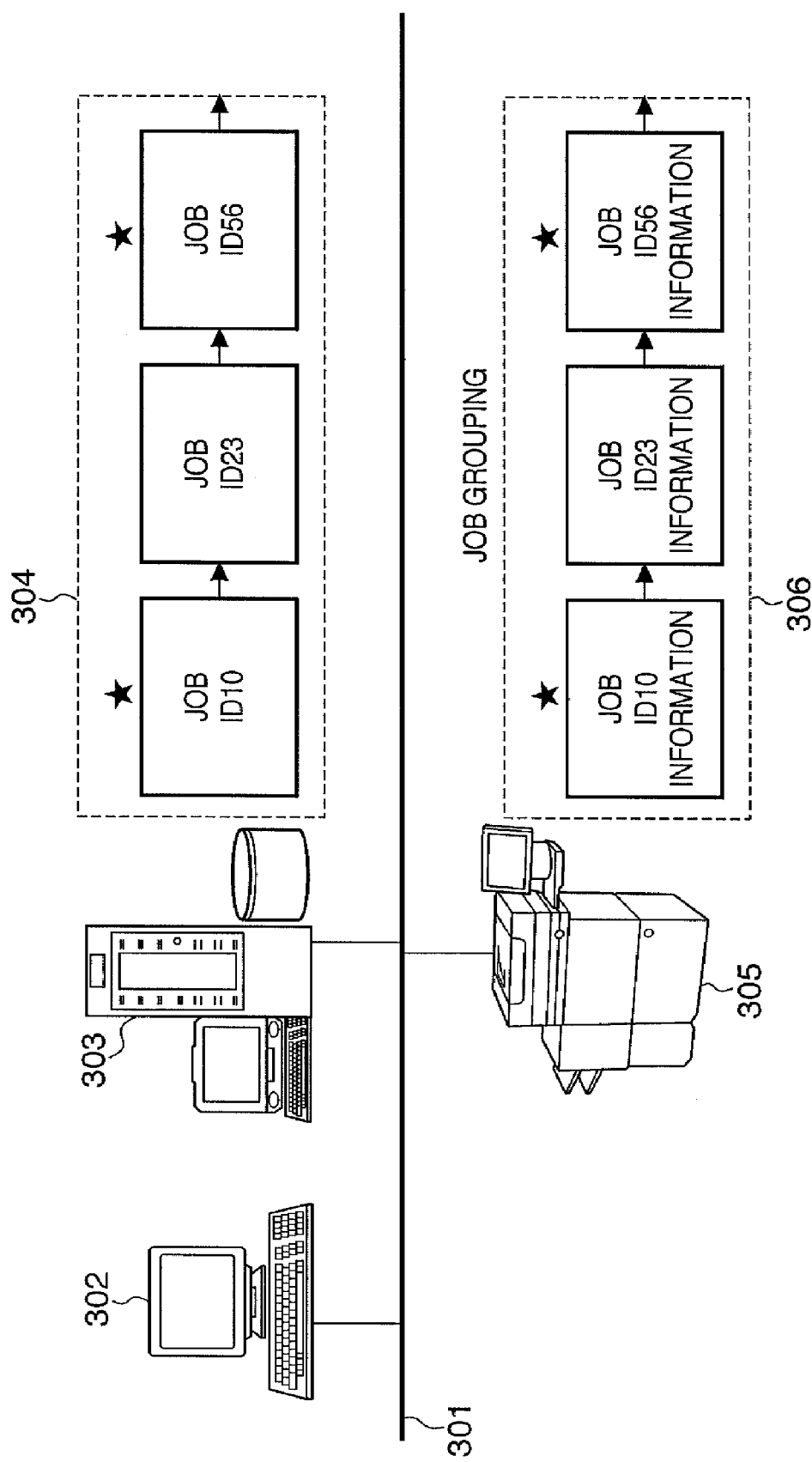
FIG. 3 is a conceptual view of data that is stored by devices when a plurality of print jobs that have been stored in a single server are pull-printed.

FIG. 3 is a conceptual view of data that is stored by devices when a plurality of print jobs that have been stored in a single server are pull-printed.

A network line 301 includes the Internet and an intranet. A client personal computer 302 specifies the registration of forms, etc. A server machine 303 may be installed at a location on the Internet or the intranet. Print jobs present in the server machine have substance 304. In the first embodiment, print jobs having job IDs 10, 23, 56 have been stored. An MFP 305 performs group printing of the print jobs of IDs 10, 23, 56. Group job information 306 contains the order in which the plurality of print jobs are printed. It should be noted that the substance of the print jobs need not be stored within the group job information 306. It will suffice if the logical positions of the jobs in a job group 304 stored in the server 303 are stored in the group job information 306.

Figure 4:
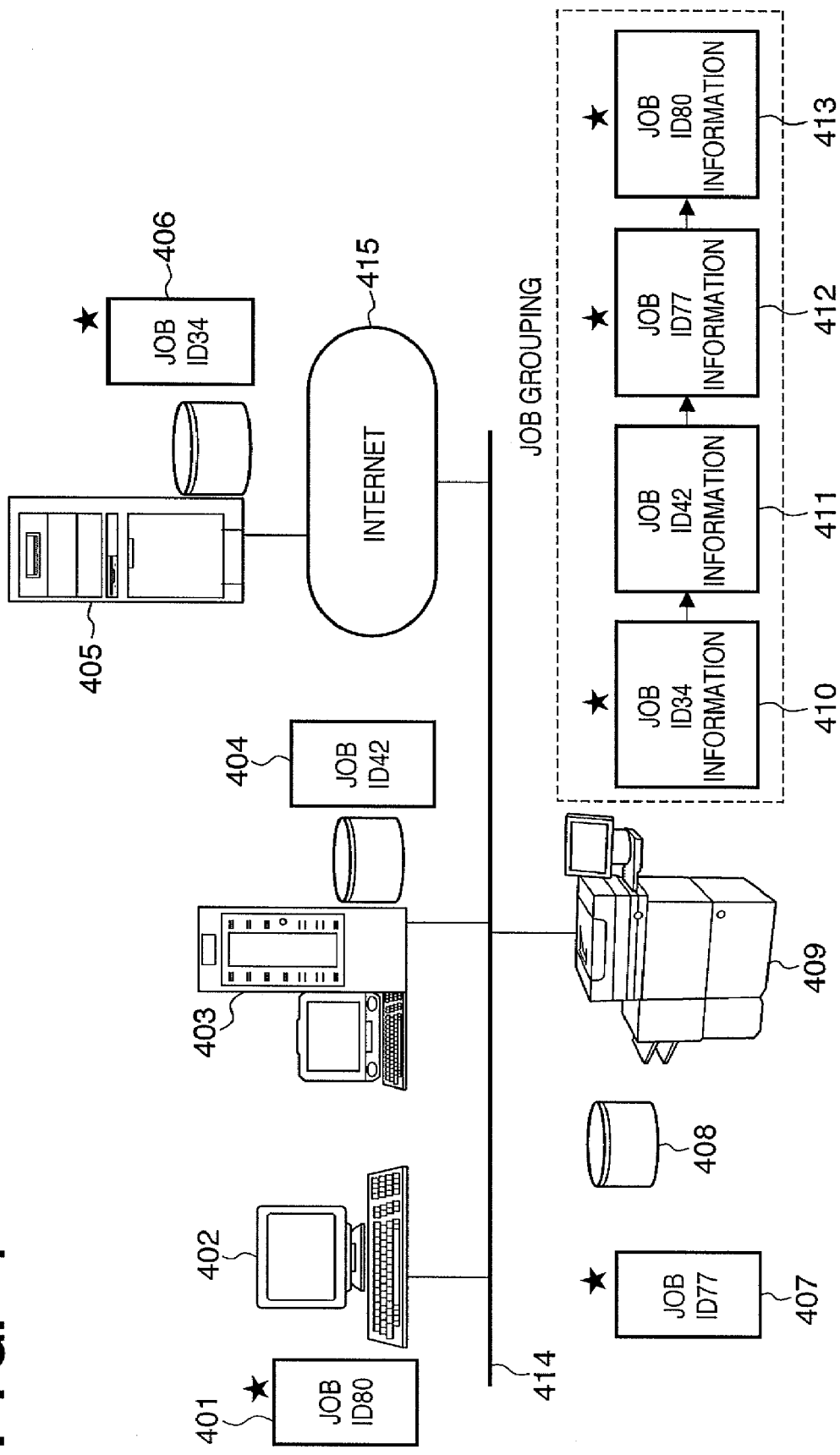
FIG. 4 is a conceptual view of data that is stored by devices when a plurality of print jobs that have been stored in a plurality of servers are pull-printed.

FIG. 4 is a conceptual view of data that is stored by devices when a plurality of print jobs that have been stored in a plurality of servers are pull-printed.

Illustrated in FIG. 4 are a LAN line 414, a server machine 402 having a stored job 401, a server 403 having a stored job 404, an Internet line 415 and a server 405 present on the Internet. In other words, the server 405 constructs an Internet cabinet, where a job 406 has been stored. Also shown are an MFP 409 and a device box 408, which is a job storage area in the device. A job 407 exists in the box.

Further, FIG. 4 represents circumstances when a group job (combined print job) is generated and printed from the print jobs 410 to 413. Jobs of job IDs 34, 42, 77, 80 are the object of the group job and are stored in respective ones of different storage areas in the manner illustrated. Printing is designated in the order 34, 42, 77, 80, by way of example, and control is exercised in such a manner that these back-to-back jobs will not be interrupted by other jobs.

Figure 5:
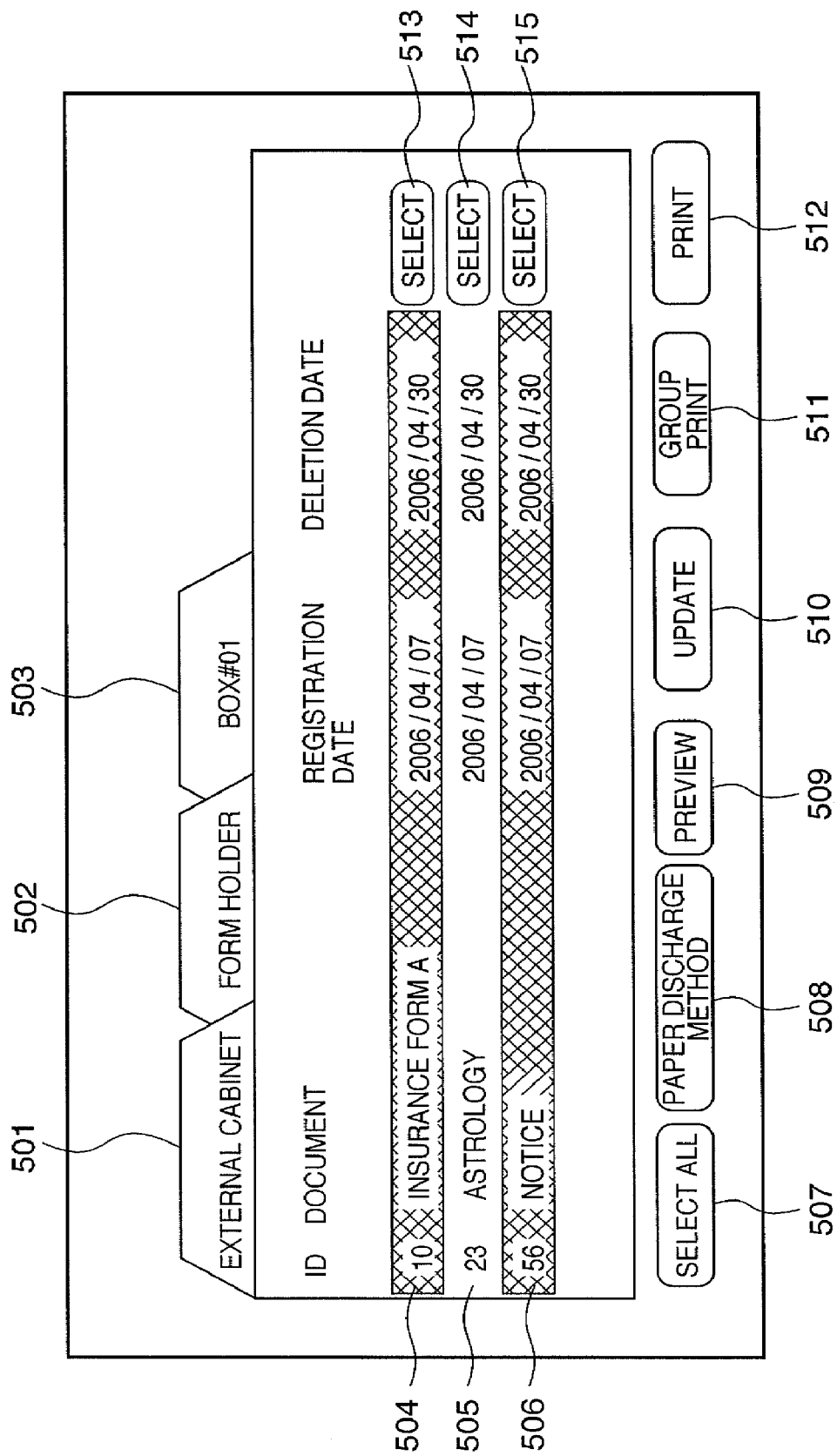
FIG. 5 is a diagram illustrating an example of a display screen for designating grouping of a plurality of print jobs.

FIG. 5 is a diagram illustrating an example of a display screen for designating grouping of a plurality of print jobs. Displays and buttons described below are displayed on a display screen, and buttons and tabs are capable of being pressed on a touch-sensitive panel.

A tab 501 is marked "External Cabinet" and is for displaying print jobs that have been stored in the storage unit 24 of the Internet cabinet 25. A table 502 marked "Form Holder" is for displaying print job within the intranet cabinet 21. A tab 503 marked "Box #1" is for displaying print jobs within the device box 22 possessed by the MFP 23 itself. In the illustration of FIG. 5, the tab 501 has been pressed, the content of the print jobs within the Internet cabinet 25 is being displayed, and three print jobs 804 to 506 are being displayed.

Job 504 has a job ID of 10, the name of the document is "INSURANCE FORM A", the date of registration in the cabinet is "2006/04/07", and the schedule deletion date is "2006/04/30". Similarly, the content of jobs 505 and 506 is as illustrated. Areas 513 to 515 are pressed when the respective jobs (here 504 to 506) are to be selected. If the area is pressed again, the job is deselected. Thus, selection and designation of a plurality of print jobs is accepted from the user. A button 507 is for selecting all displayed jobs. If this button is pressed, all of the print jobs being displayed (here jobs 504 to 506) are selected. If this button is pressed again, all of the print jobs are deselected. A button 508 selects the method of paper discharge when a job is selected and printed. For example, the printer output function, such as stapling, 2-in-1 or doubled-sided printing, is selected. A button 509 is for displaying a preview of the selected job. An update button 510 is for updating the displayed content if update is necessary.

A group print button 511 is for grouping jobs. By selecting a plurality of the aforesaid jobs and pressing the group print button 511, the jobs are grouped. In the illustration of FIG. 5, jobs 504 and 506 are grouped. By thus grouping jobs, the jobs 504 and 506 will not be interrupted by another job while their processing is in progress. Also provided is a print button 512. The print button 512 is for printing which, unlike group printing, permits interruption by another job during the processing of individual jobs.

Figure 6:
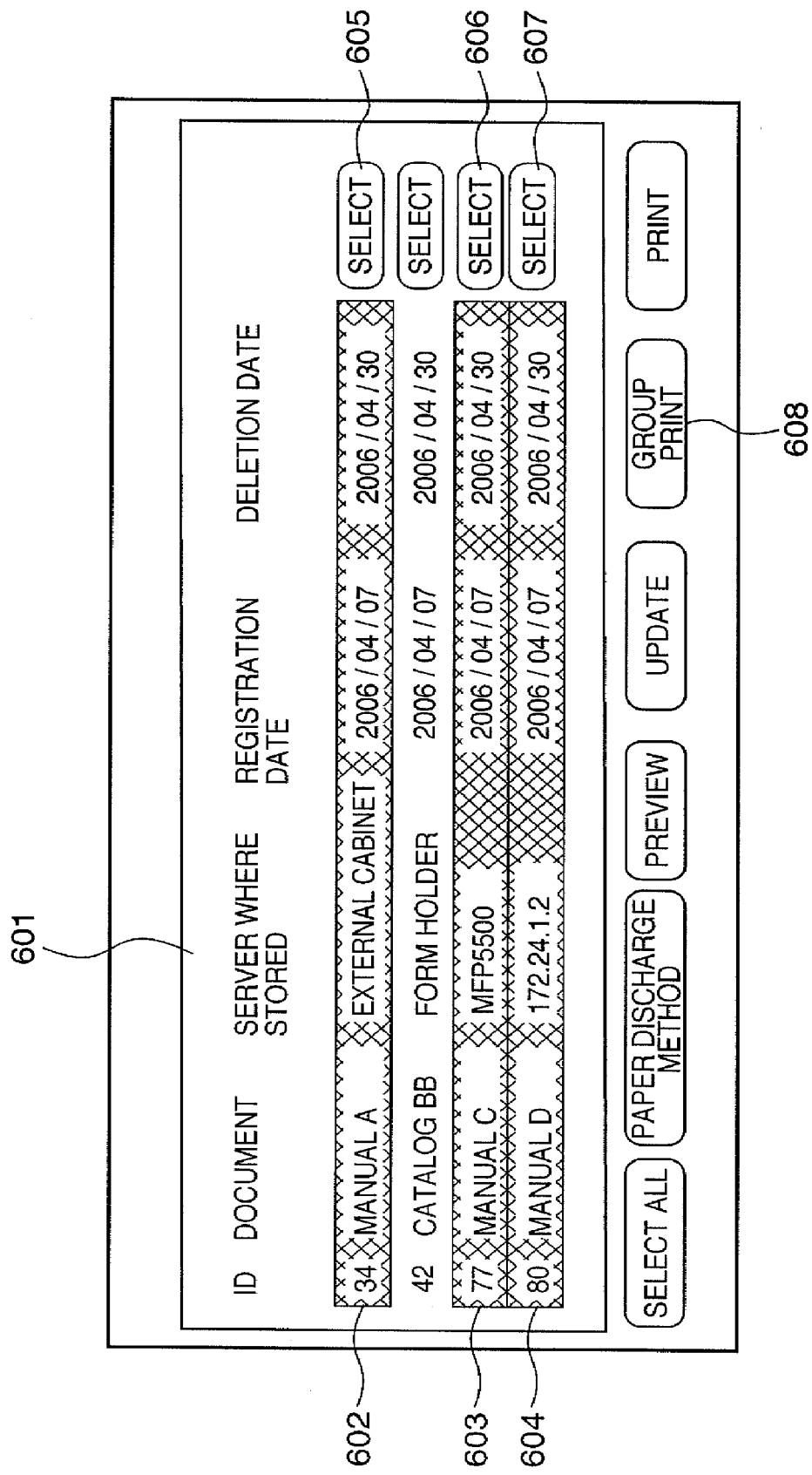
FIG. 6 is a diagram illustrating an example of a display screen for designating grouping of a plurality of print jobs spanning a plurality of servers.

FIG. 6 is a diagram illustrating an example of a display screen for designating grouping of a plurality of print jobs spanning a plurality of servers. Unlike FIG. 5, the display indicating the position of the server is does not rely upon a tab. Rather, servers are indicated on a per-job basis.

Here four print jobs having job IDs of 34, 42, 77 and 80 are being displayed. A display area 601 indicates the server where the job has been stored. A job 602 is placed in a selected mode by pressing an area 605. Similarly, jobs 603 and 606 are placed in a selected mode by pressing areas 606 and 607, respectively. In the illustration of FIG. 6, three jobs have been selected.

As for the substance of the print jobs, that of job 602 has been stored in the external cabinet, that of job 603 has been stored in a device named "MFP5500", and that of job 604 has been stored is a device having the IP address 172.24.1.2. If a button 608 is pressed with a plurality of print jobs having been selected, the plurality of print jobs are grouped and printed.

<System Operation>

Figure 7:
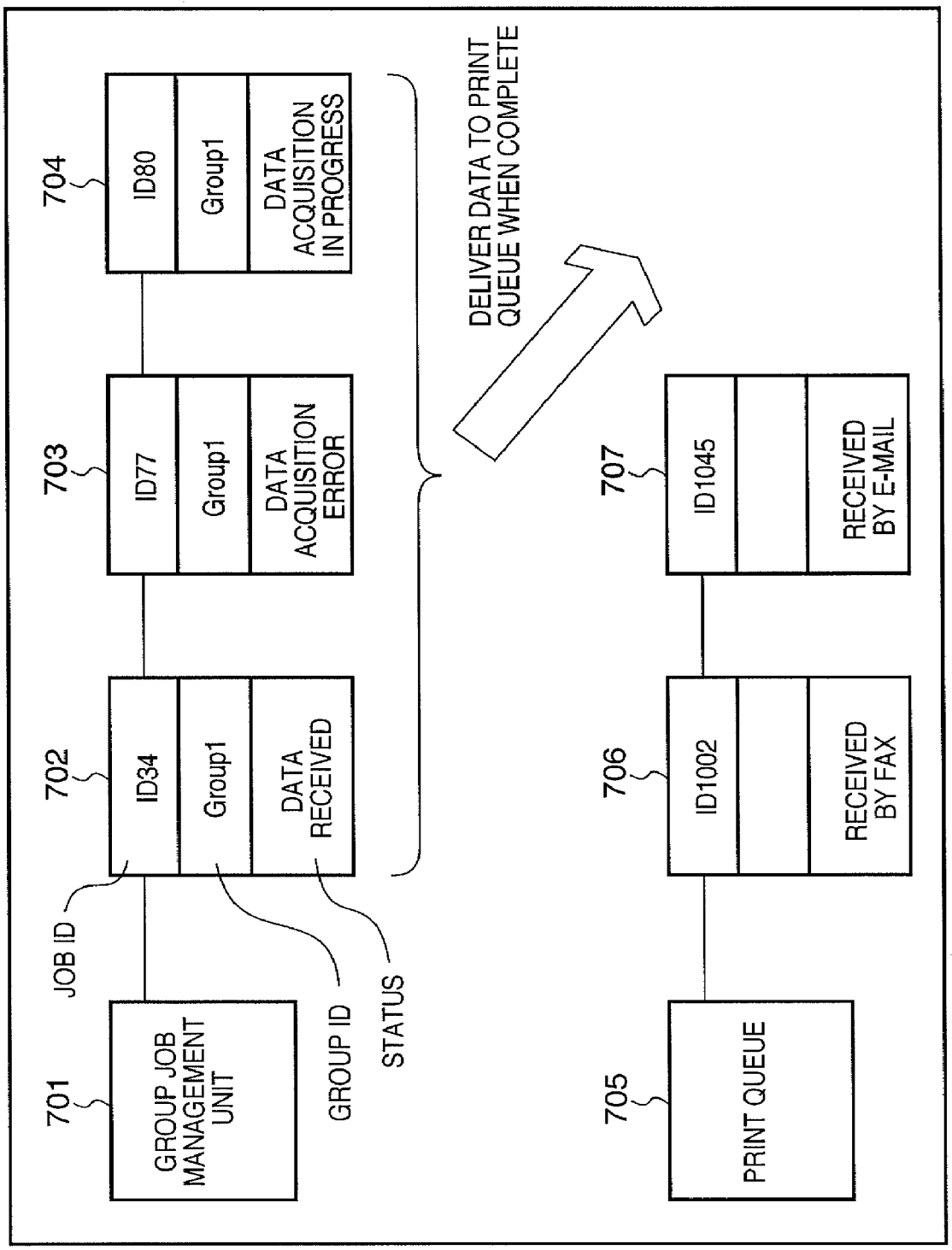
FIG. 7 is a diagram exemplifying a state in which grouped jobs are delivered to a print queue.

FIG. 7 is a diagram exemplifying a state in which grouped jobs are delivered to a print queue.

A group job management unit (which corresponds to the group job management unit 108) 701 is provided within the MFP 23. Job information within the MFP 23 is managed in a manner indicated by 702 to 704. Individual job information is job ID, group ID and status. With regard to job 702, the job ID is 34, the group ID is Group 1, and the status is "DATA RECEIVED". Similarly, with regard to job 703, the job ID is 77, the group ID is Group 1, and the status is "DATA ACQUISITION ERROR". Further, with regard to job 704, the job ID is 80, the group ID is Group 1, and the status is "DATA ACQUISITION IN PROGRESS".

A print queue (which corresponds to print queue 103) 705 is provided within the MFP 23. Job information has been stored in the print queue 705 as well. A job 706 has a job ID of 1002 and has been received by facsimile. A job 707 has a job ID of 1045 and has been received by e-mail.

Figure 8:
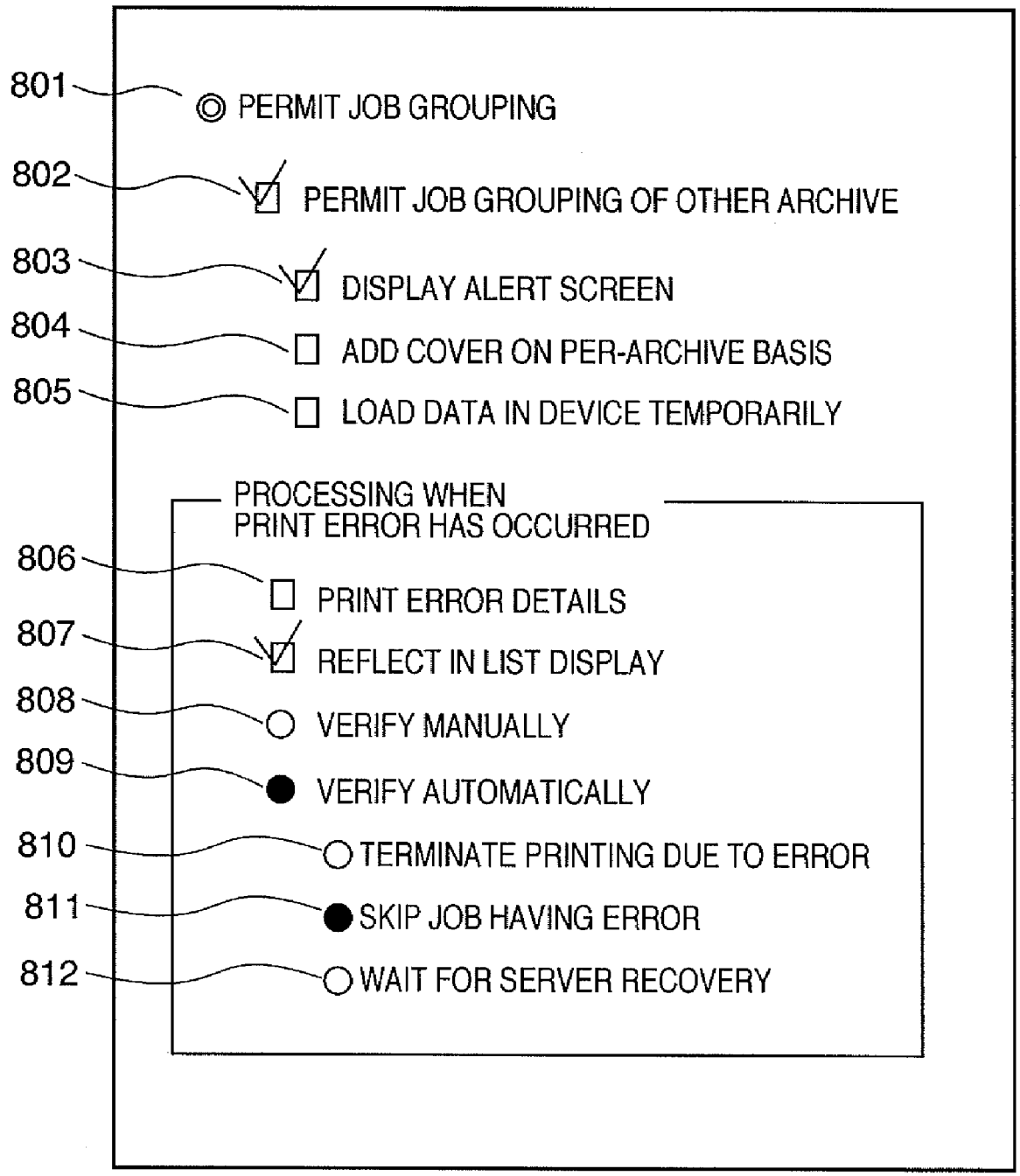
FIG. 8 is a diagram illustrating an example of a setting screen for accepting settings when grouping of jobs is performed.

FIG. 8 is a diagram illustrating an example of a setting screen for accepting settings when grouping of jobs is performed.

A switch 801 is for setting whether or not the job grouping setting is permitted to be made by the user. Here job grouping has been permitted. A switch 802 is for designating whether or not job grouping of another archive is permitted. This is a switch for designating whether jobs in a plurality of different servers are permitted to be grouped. For example, a guard can be applied such as one that does not allow a novice to use grouping of jobs located in a plurality of servers.

A switch 803 is for setting whether a verification (alert) dialog (FIG. 9) is to be displayed when the user has designated the grouping of a plurality of jobs located in different servers. A switch 804 is for adding a cover sheet to each job constituting a job group. A switch 805 is for temporarily loading all data in the device (MFP) when group printing is performed. If the switch 805 is turned on, an operation for acquiring all of the print job data of jobs 702 to 704 is performed and the data is delivered to the print queue after it is determined whether the status is "DATA RECEIVED" or "DATA ACQUISITION ERROR". If the switch 805 is off, the job information of jobs 702 to 704 is delivered to the print queue when the group print button is pressed. Acquisition of print jobs (substance) described in the job information is performed in the print queue.

Figure 10:
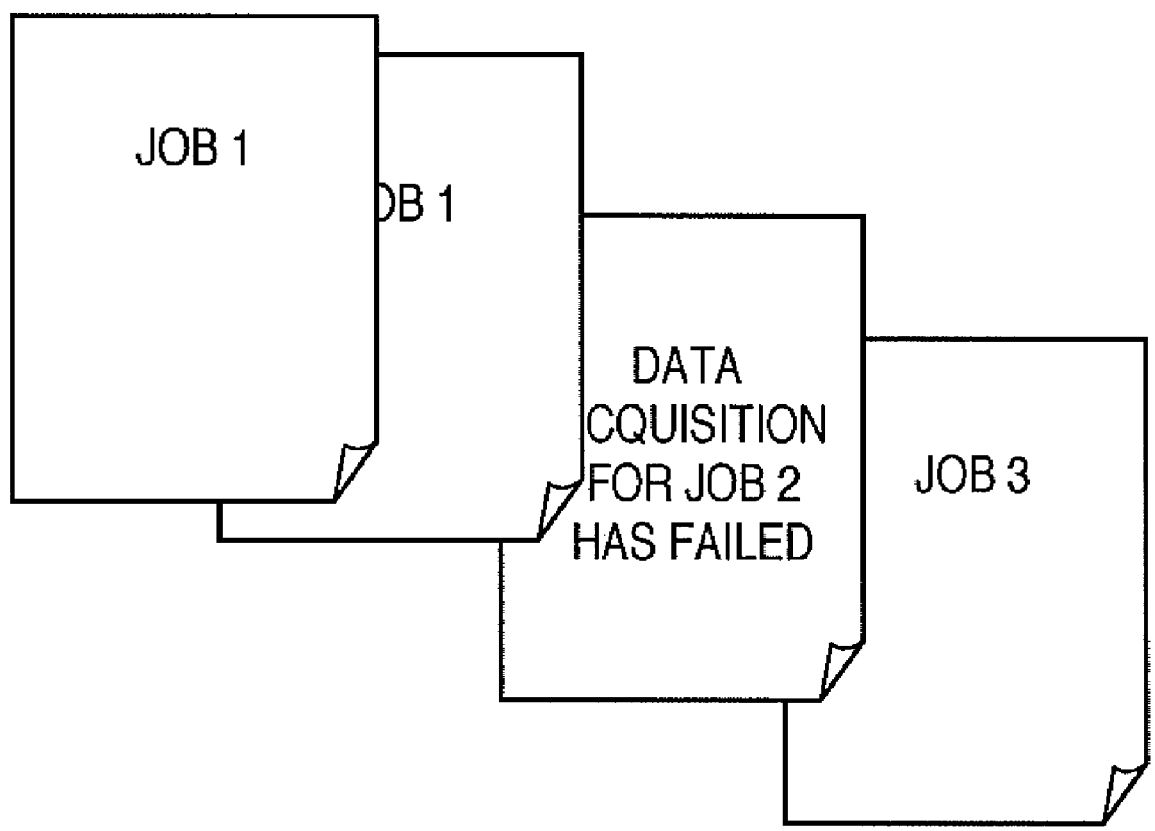
FIG. 10 is a diagram illustrating example of output of an error report.
Figure 12:
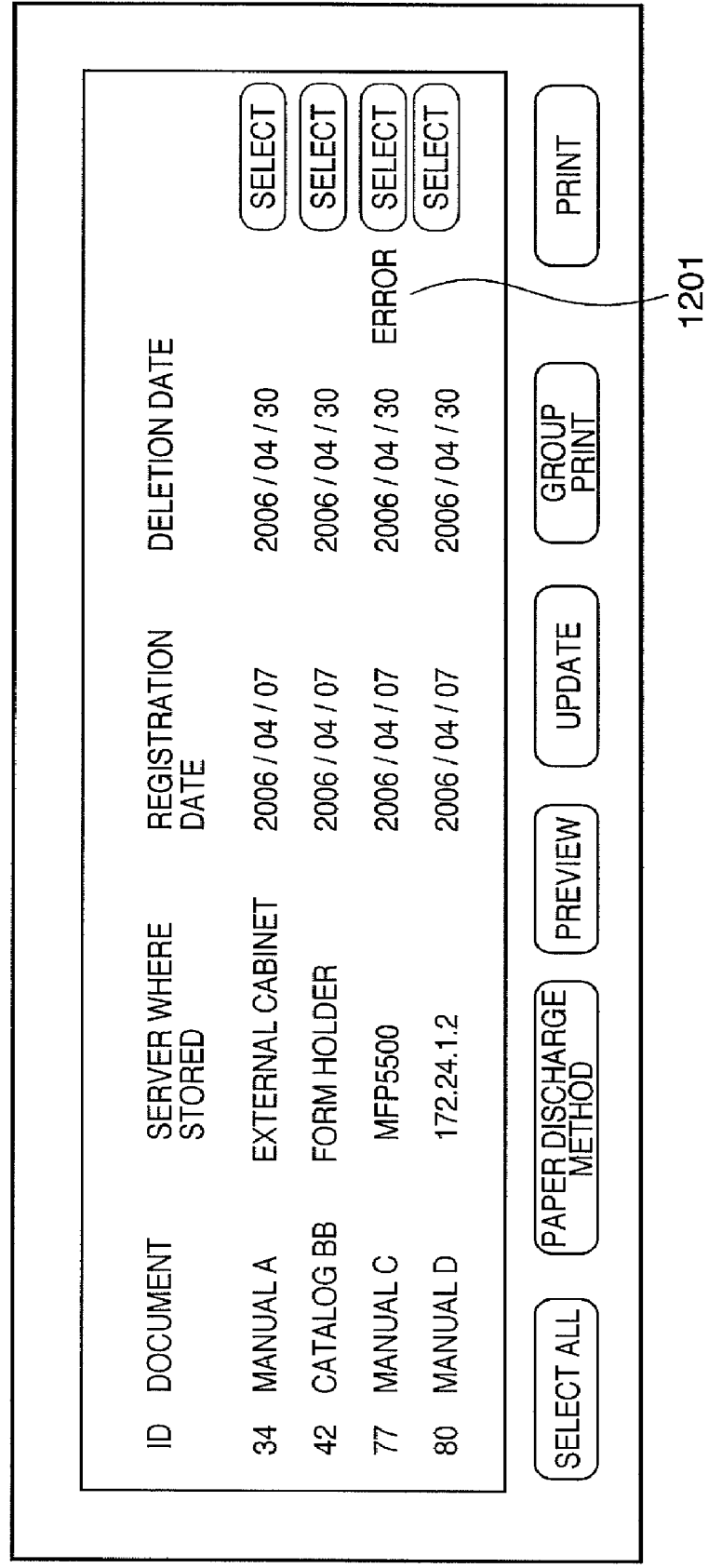
FIG. 12 is a diagram illustrating an example of a display screen for designating grouping (this example is for a case where print jobs include a print job for which an error has occurred)

A switch 806 is for setting the printing of error details. If the switch 806 is turned on, a report exemplified in FIG. 10 is output when an error occurs in a group job. A switch 807 is for designating whether or not to display the fact that an error has occurred in a job within a job list that is being displayed. By displaying whether or not there is an acquisition error on a per-job basis as shown in FIG. 12, it is possible to indicate that an error has occurred.

A switch 808 is for so arranging it that selection of post-processing is accepted from the user when an error has occurred. By pressing the switch 808, dialog of the kind shown in FIG. 11 is displayed on the display unit 106 when an error has occurred.

A switch 809 is a switch which, if selected, automatically executes post-processing that has been registered at 810 to 812; dialog is not displayed at the occurrence of an error. A switch 810 is for setting termination of printing due to error, in a manner similar to that of the prior art, when even one error has occurred. A switch 811 is for skipping a job. Specifically, when a job in progress in a group job develops an error, the switch 811 is for setting that this job should be skipped and that the next job should be printed. Further, a switch 812 is for setting that server recovery (error recovery) should be awaited when an error has occurred. This switch establishes a mode in which the order of the pages is assured without fail, although output is delayed.

If the switch 811 has been selected, the job in which the error has occurred is skipped and jobs other than this job are grouped and printed, thereby enabling printing immediately without the need to wait for error recovery. If the switch 812 has been selected, the start of printing is delayed owing to the need to wait for error recovery, but all selected jobs can be grouped and printed reliably.

By making it possible to select any of these modes, an easy-to-use job grouping system conforming to user needs is constructed. For example, with regard to an urgent job that requires to be printed immediately, selecting switch 811 for skipping error jobs enables the immediate printing of jobs other than error jobs. With regard to an important job that requires the job to be printed in the correct order, selecting the server-recovery wait switch 812 enables the printing of grouped jobs accurately while waiting for error recovery at the server.

Figure 13:
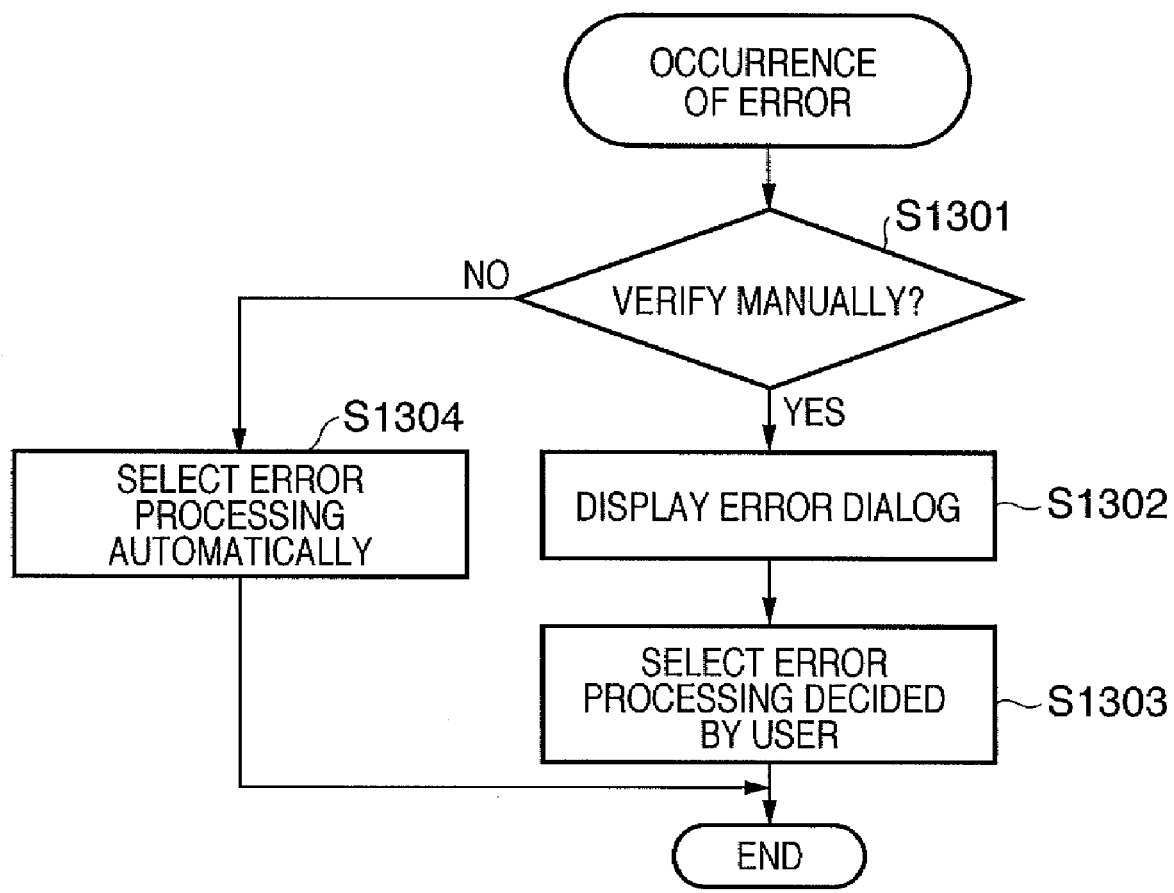
FIG. 13 is a simplified operation flowchart of operation when an error has occurred in the print processing system according to the first embodiment.

FIG. 13 is a simplified operation flowchart of operation when an error has occurred in the print processing system according to the first embodiment. The flow described below is implemented by executing control software (not shown) using the CPU 105.

At step S1301 in FIG. 13, the CPU 105 determines whether manual verification has been set for when an error occurs. In other words, the CPU 105 checks to determine whether the switch 808 for manual verification has been turned on. If the switch has been turned on to set manual verification, then control proceeds to step S1302; otherwise, control proceeds to step S1304.

Error dialog (FIG. 11) is displayed on the display unit 106 at step S1302.

At step S1303, selection of processing from the user is accepted via the error dialog displayed at step S1302.

At step S1304, processing is selected based upon the previous set values (810 to 812 in FIG. 8).

Selection of an operation in the event of an error is thus performed by the foregoing steps.

Figure 14:
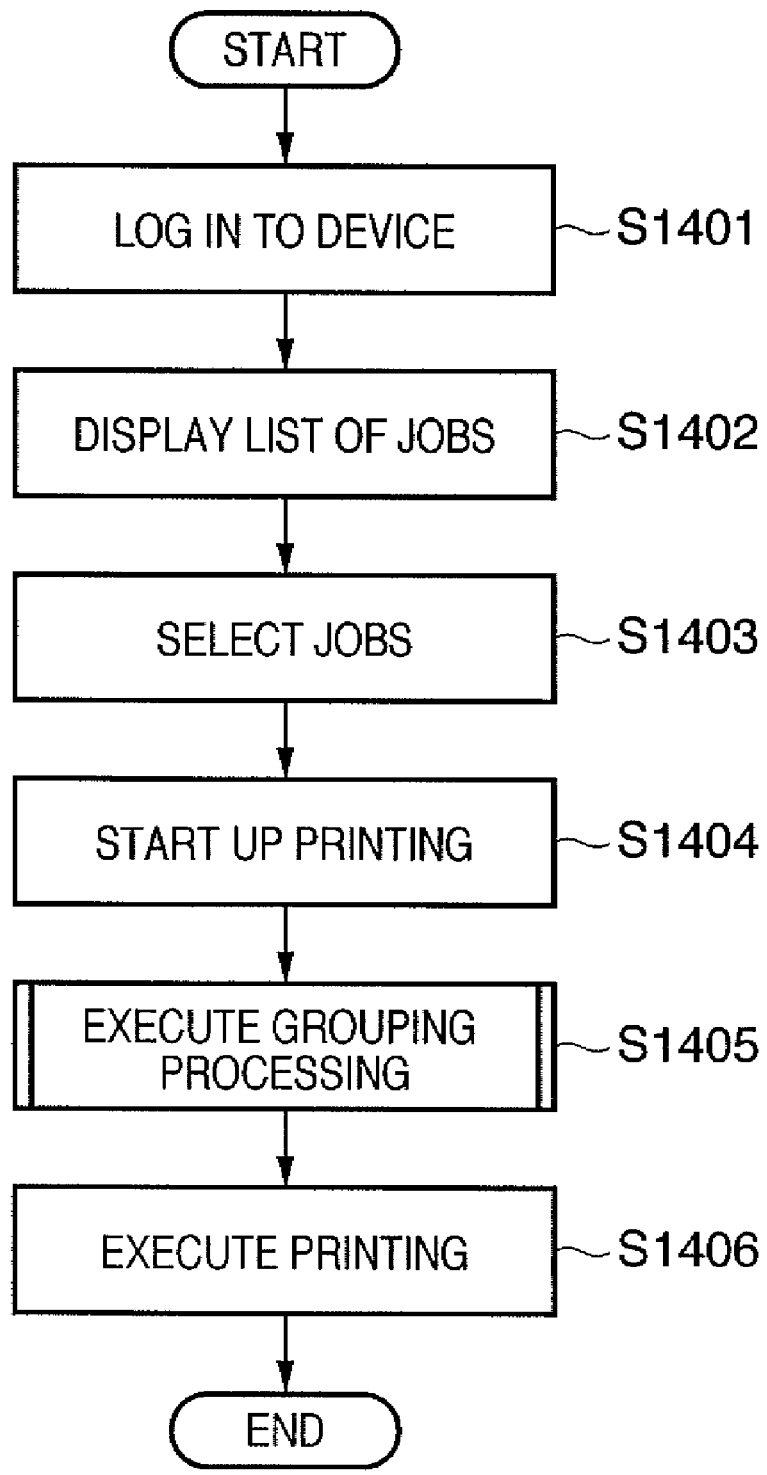
FIG. 14 is a simplified operation flowchart of operation when printing is performed in the print processing system according to the first embodiment.

FIG. 14 is a simplified operation flowchart of operation when printing is performed in the print processing system according to the first embodiment.

At step S1401, the MFP 23 accepts user login. The user enters an ID by pressing keys on the control panel of the MFP 23 or performs authentication by using a magnetic ID card.

At step S1402, the MEP 23 displays a list of selectable jobs on the display unit 106. For example, this is implemented by pressing an operation key for displaying jobs. The display is as shown in FIG. 5 or 6.

At step S1403, the MFP 23 accepts job selection. For example, the pressing of keys such as 513, 514, 515 by the user is accepted and selection of displayed jobs is accepted.

At step S1404, the MFP 23 executes start-up of print processing. Specifically, the MFP 23 starts up print processing with the jobs selected at step S1403 being adopted as a group job. This is implemented by pressing button 512.

At step S1405, the MFP 23 executes grouping processing. The details will be described later with reference to FIG. 15.

At step S1406, the MFP 23 starts up the printer engine and executes printing.

The results of processing of print jobs grouped via the foregoing steps are output in the proper order.

Figure 15:
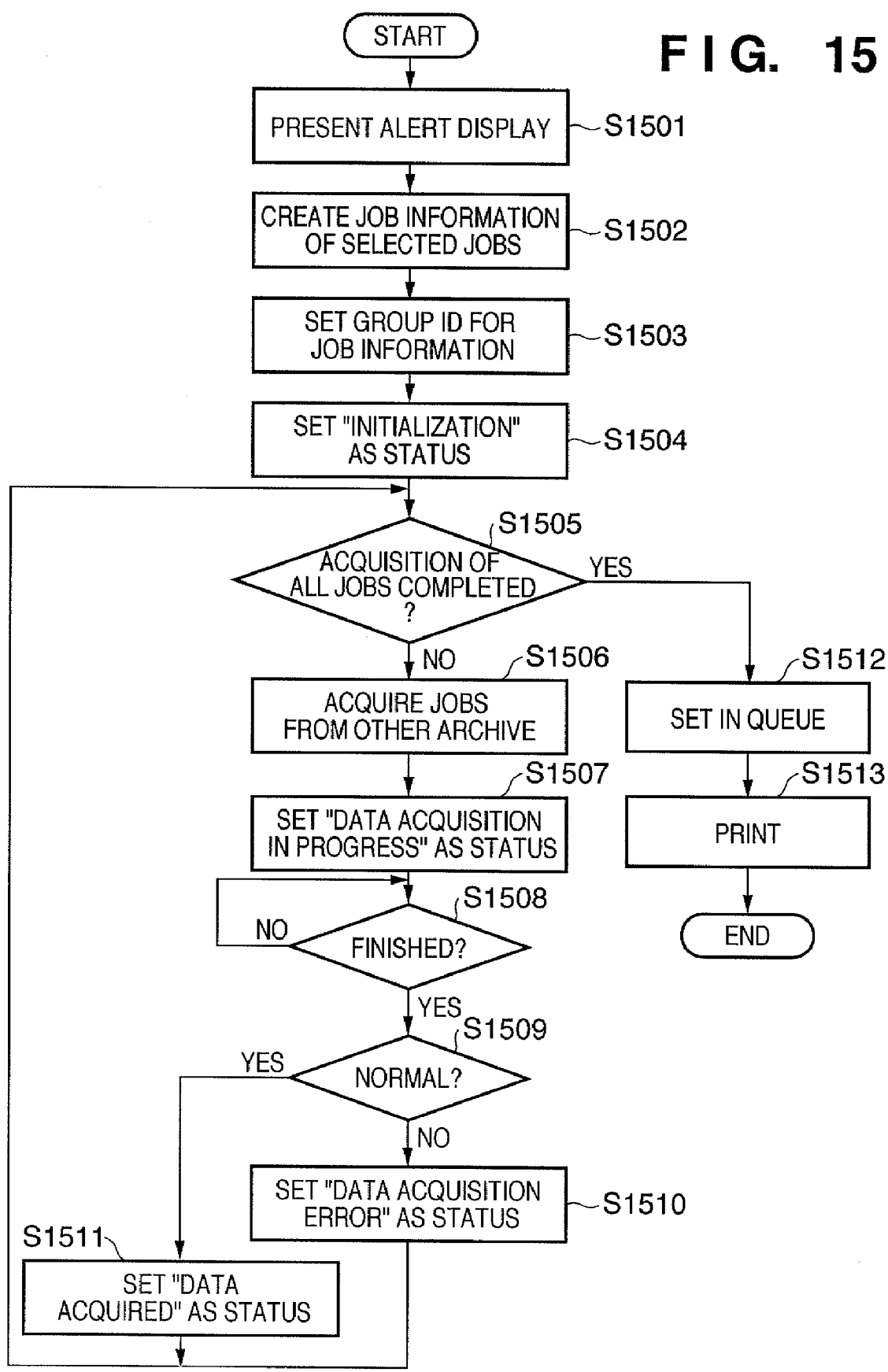
FIG. 15 is a detailed flowchart of job grouping (step S1405 of FIG. 14).

FIG. 15 is a detailed flowchart of job grouping (step S1405 of FIG. 14). The flow described below is implemented by executing control software (not shown) using the CPU 105.

At step S1501, verification (alert) dialog is displayed on the display unit 106. In other words, the CPU 105 causes the dialog exemplified in FIG. 9 to be displayed and notifies the user of the fact that at least one print job among the selected plurality of print jobs is being managed by another server.

At step S1502, job information concerning the plurality of jobs selected at step S1501 is created within the MFP 23. The job information 702 to 704 is created by this step.

At step S1503, a group ID is set for the job information 702 to 704 created at step S1502. Further, at step S1504, "INITIALIZATION" status is set in the status portions of the items of job information 702 to 704 created at step S1502.

At step S1505, the plurality of jobs selected at step S1501 are acquired. If there is a job for which acquisition has not been completed, control proceeds to step S1506. If acquisition of all jobs has been completed, then control proceeds to step S1512.

At step S1506, job information for which the status is "INITIALIZATION" is retrieved and acquisition of print jobs described in the job information from the corresponding server is started. Then, at step S1507, the status of the job information is changed to "DATA ACQUISITION IN PROGRESS".

At step S1508, it is determined whether job acquisition applicable to the job information retrieved at step S1506 has been completed. If it has not been completed, processing continues until acquisition is completed. Control proceeds to step S1509 following a determination that acquisition has been completed.

At step S1509, it is determined whether job acquisition has been completed normally at step S1508. Control proceeds to step S1511 if acquisition has been completed normally. Otherwise, control proceeds to step S1510.

At step S1510, the status of the job information is changed to "DATA ACQUISITION ERROR". At step S1511, on the other hand, the status of the job information is changed to "DATA ACQUIRED". At the end of step S1510 or S1511, control returns to step S1505 and the step of determining whether all jobs have ended is executed again.

At step S1512, grouped jobs are delivered to the print queue. In other words, a group job (combined print job) is generated from the plurality of print jobs for which grouping has been designated, and the group job (702 to 704) is delivered to the print queue 705.

Printing is executed at step S1513. Specifically, print jobs are read out in order from the top of the print queue and images are formed on paper in the printing unit 102.

In accordance with the first embodiment, as described above, problems involved in the grouping of jobs spanning a plurality of servers can be solved. That is, in a case where one or more print jobs among a grouped plurality of jobs has developed an error, it is possible to continue the processing of the print jobs in accordance with a command entered by the user via a control input unit previously or at the occurrence of an error. As a result, it is possible to eliminate the inconvenience of processing being forcibly terminated due to error, as is done in the prior art.

Further, by making it possible to select operation at the occurrence of an error, a user-friendly print function that relies upon job grouping can be can be provided. Specifically, needless labor can be eliminated by assuming that an error has occurred in grouping processing. In addition, by skipping a job in which an error has occurred, monitoring time can be curtailed and the printout can be obtained sooner. Furthermore, by monitoring the server possessing the print job in which the error has occurred, printing can be performed promptly when the server recovers and it is possible to assure printing in the proper order, which is one goal of job grouping.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-096596, filed Apr. 2, 2007, which is hereby incorporated by reference herein in its entirety.

What is claimed is:

1. A print processing system that includes a plurality of server apparatuses each storing a print job, and a control apparatus controlling execution of processing of the print job by designating the print job stored in said server apparatus, wherein said control apparatus comprises:

a designation unit for designating a plurality of print jobs;

a generation unit for acquiring the plurality of print jobs, which have been designated by said designation unit, from the plurality of server apparatuses, and generating a combined print job that includes the plurality of print jobs; and a setting unit which, when an error has occurred in the acquisition of at least one of the plurality of print jobs in said generation unit, is for setting whether to exercise control so as to execute processing of the combined print job inclusive of all of the plurality of print jobs after recovery from the error is achieved, or so as to execute processing of the combined print job inclusive of print jobs with the exception of the print job in which the error occurred.

2. The system according to claim 1, wherein said control apparatus further comprises an operation input unit for accepting operation input from a user; and the setting performed by said setting unit is performed in advance by an operation input from a user via said operation input unit.

3. The system according to claim 1, wherein said control apparatus further comprises an operation input unit for accepting operation input from a user; and the setting performed by said setting unit is performed, at occurrence of an error, by an operation input from a user via said operation input unit.

4. The system according to claim 2, wherein said control apparatus further comprises a display unit; and the designation performed by said designation unit is performed by designating selection from a list of print jobs displayed on said display unit by said operation input unit.

5. The system according to claim 4, wherein whether or not an error has occurred in acquisition of the print jobs is also displayed in the list of print jobs displayed on said display unit.

6. A control apparatus, which is connected via a network to a plurality of one server apparatuses each storing a print job, for controlling execution of processing of the print job by designating the print job stored in said server apparatus, said control apparatus comprising:

a designation unit for designating a plurality of print jobs;

a generation unit for acquiring the plurality of print jobs, which have been designated by said designation unit, from the plurality of applicable server apparatuses, and generating a combined print job that includes the plurality of print jobs; and a setting unit which, when an error has occurred in the acquisition of at least one of the plurality of print jobs in said generation unit, is for setting whether to exercise control so as to execute processing of the combined print job inclusive of all of the plurality of print jobs after recovery from the error is achieved, or so as to execute processing of the combined print job inclusive of print jobs with the exception of the print job in which the error occurred.

7. The apparatus according to claim 6, further comprising an operation input unit for accepting operation input from a user; and wherein the setting performed by said setting unit is performed in advance by an operation input from a user via said operation input unit.

8. The apparatus according to claim 6, further comprising an operation input unit for accepting operation input from a user; and wherein the setting performed by said setting unit is performed, at occurrence of an error, by an operation input from a user via said operation input unit.

9. The apparatus according to claim 7, further comprising a display unit; and wherein the designation performed by said designation unit is performed by designating selection from a list of print jobs displayed on said display unit by said operation input unit.

10. The apparatus according to claim 9, wherein whether or not an error has occurred in acquisition of the print jobs is also displayed in the list of print jobs displayed on said display unit.

11. A method of controlling a control apparatus, which is connected via a network to a plurality of one server apparatuses each storing a print job, for controlling execution of processing of the print job by designating the print job stored in said server apparatus, said method comprising:

a designation step of designating a plurality of print jobs;

a generation step of acquiring the plurality of print jobs, which have been designated at said designation step, from the plurality of server apparatuses, and generating a combined print job that includes the plurality of print jobs; and a setting step which, when an error has occurred in the acquisition of at least one of the plurality of print jobs at said generation step, is a step of setting whether to exercise control so as to execute processing of the combined print job inclusive of all of the plurality of print jobs after recovery from the error is achieved, or so as to execute processing of the combined print job inclusive of print jobs with the exception of the print job in which the error occurred.

12. A computer-readable recording medium storing a computer program for controlling a control apparatus, which is connected via a network to a plurality of one server apparatuses each storing a print job, for controlling execution of processing of the print job by designating the print job stored in said server apparatus, said computer program comprising:

a designation step of designating a plurality of print jobs;

a generation step of acquiring the plurality of print jobs, which have been designated at said designation step, from the plurality of server apparatuses, and generating a combined print job that includes the plurality of print jobs; and a setting step which, when an error has occurred in the acquisition of at least one of the plurality of print jobs at said generation step, is a step of setting whether to exercise control so as to execute processing of the combined print job inclusive of all of the plurality of print jobs is executed after recovery from the error is achieved, or so as to execute processing of the combined print job inclusive of print jobs with the exception of the print job in which the error occurred.

* * * * *